United States Patent
Ishii et al.

(10) Patent No.: US 8,004,696 B2
(45) Date of Patent: Aug. 23, 2011

(54) PRINTING APPARATUS AND COMPUTER PROGRAM PRODUCT FOR DELIMITING RECEIVED DATA

(75) Inventors: Hidekazu Ishii, Aisai (JP); Yuji Iida, Chita (JP); Akihiko Niwa, Toki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 999 days.

(21) Appl. No.: 11/904,348

(22) Filed: Sep. 27, 2007

(65) Prior Publication Data

US 2008/0252911 A1    Oct. 16, 2008

(30) Foreign Application Priority Data

Nov. 2, 2006 (JP) .................................. 2006-299342

(51) Int. Cl.
*G06F 3/12* (2006.01)
*G06K 15/02* (2006.01)
*G06K 15/00* (2006.01)

(52) U.S. Cl. ...... 358/1.1; 358/1.11; 358/1.13; 358/1.18; 347/14

(58) Field of Classification Search .................... 358/1.1, 358/1.11–1.18, 1.9; 347/14; 707/201
See application file for complete search history.

(56) References Cited

U.S. PATENT DOCUMENTS

| 4,918,723 A * | 4/1990 | Iggulden et al. ......... 379/100.17 |
| 6,530,072 B1 * | 3/2003 | Hagerman et al. ............. 716/103 |
| 7,315,613 B2 * | 1/2008 | Kleindienst et al. ....... 379/88.13 |
| 7,761,871 B2 * | 7/2010 | Edwards et al. ............... 717/176 |
| 2002/0165912 A1 * | 11/2002 | Wenocur et al. ............... 709/203 |
| 2003/0042319 A1 * | 3/2003 | Moore .......................... 235/494 |
| 2005/0099442 A1 * | 5/2005 | Payne ............................. 347/14 |
| 2005/0132278 A1 * | 6/2005 | Yoshida .......................... 715/513 |
| 2006/0044278 A1 * | 3/2006 | Fux et al. ....................... 345/168 |
| 2006/0259519 A1 * | 11/2006 | Yakushev et al. ............. 707/201 |

FOREIGN PATENT DOCUMENTS

| JP | 5-199990 | 8/1993 |
| JP | 2004-330688 | 11/2004 |

* cited by examiner

*Primary Examiner* — James A Thompson
*Assistant Examiner* — Satwant Singh
(74) *Attorney, Agent, or Firm* — Day Pitney LLP

(57) ABSTRACT

In a printing apparatus, the number of delimiters included in received data from a host apparatus is smaller than the number of input items of a template by one. Therefore, the number of delimiters included in the received data from the host apparatus is calculated to be three. A character string which is periodically repeated in the received data three times as the number of the delimiters is obtained and set to be a delimiter candidate. Further, a print start character string candidate is obtained from a data group which is located after a last delimiter candidate in the received data. Using the provisionally determined candidates for a delimiter and a print start character string, the four item data included in the received data are assumed. Then, a print preview is displayed on a LCD so as to show a state where the four item data is input to each of the input items of the template.

22 Claims, 13 Drawing Sheets

FIG. 2

| Label | Content |
|---|---|
| 61A (1/8) | SUBTOTAL 100 50 200 / TOTAL 350 / ABC |
| 61B (2/8) | SUBTOTAL 100 50 200 / TOTAL 35 / ABC |
| 61C (3/8) | SUBTOTAL 100 50 200 / TOTAL 3 / ABC |
| 61D (4/8) | SUBTOTAL 100 50 200 / TOTAL / ABC |
| 61E (5/8) | SUBTOTAL 10 5 20 / TOTAL 350 / ABC |
| 61F (6/8) | SUBTOTAL 10 5 20 / TOTAL 35 / ABC |
| 61G (7/8) | SUBTOTAL 10 5 20 / TOTAL 3 / ABC |
| 61H (8/8) | SUBTOTAL 10 5 20 / TOTAL / ABC |

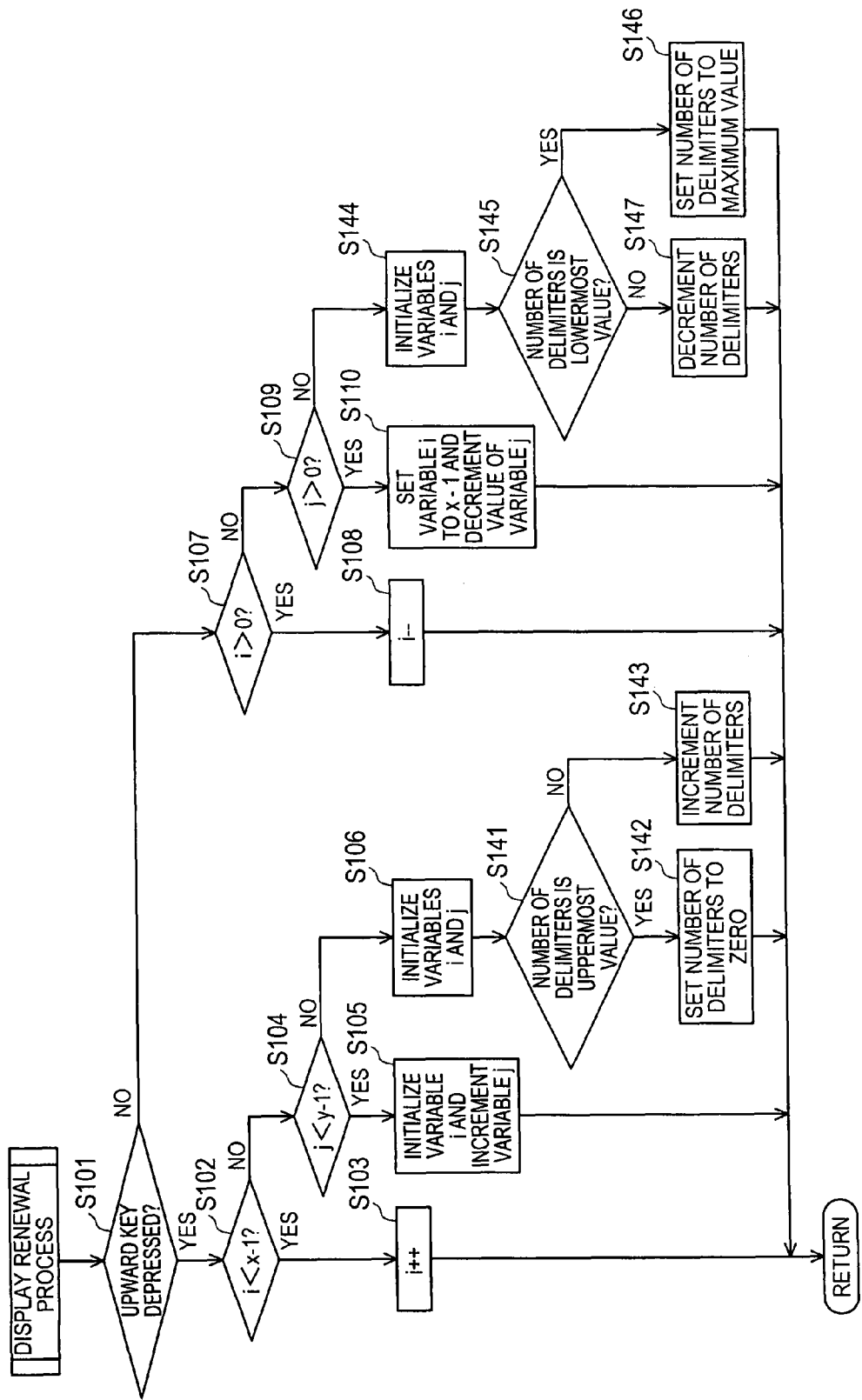

PRINTING APPARATUS AND COMPUTER PROGRAM PRODUCT FOR DELIMITING RECEIVED DATA

CROSS-REFERENCE TO RELATED APPLICATIONS

The present application claims priority from JP 2006-299342, filed on Nov. 2, 2006, the disclosure of which is herein incorporated by reference in its entirety.

TECHNICAL FIELD

The disclosure relates to a printing apparatus and a computer program product for printing a template where received data is input to input items.

BACKGROUND

Conventionally, when a printing apparatus receives data from a host apparatus such as a scale, a bar code reader, a medical equipment and the like, item data included in the received data is input to each input item of a template of the printing apparatus. The data received from the host apparatus includes item data, a delimiter, a print start command and the like. Therefore, a user preliminary registered a delimiter character, a print start character and the like which are used by the host apparatus such that the printing apparatus automatically analyzes the item data, a delimiter, a print start command and the like based on the data received from the host apparatus. After such initial setting has been performed, the printing apparatus automatically analyzes the item data, the delimiter, the print start command included in the received data whenever the printing apparatus receives data from the host apparatus. Therefore, the template where the item data included in the received data has been input to the input items can be set to be in an appropriate state.

Japanese Patent Application Laid-open No. 5-199990 and Japanese Patent Application Laid-open No. 2004-330688 disclose a printing apparatus which automatically analyzes data received from a host computer.

However, if a configuration of data received from the host apparatus is unknown to the user, it is difficult for the user to preliminary register a delimiter character, a print start character and the like which are used by the host apparatus. Therefore, even if the printing apparatus receives data from the host apparatus, the item data, the delimiter or the print start command included in the received data cannot be identified correctly. Thus, the template where the item data included in the received data is input to the input items cannot be set to be in an appropriate state.

SUMMARY

The disclosure has been made in view of the above circumstances and has an object to overcome the above problems and to provide a printing apparatus and a computer program product which can set a template in a state where item data included in received data is appropriately input to input items of the template even if a configuration of received data is unknown to a user.

To achieve the purpose of the disclosure, there is provided a printing apparatus comprising: a template storing device that stores a template having a plurality of input items; a receiving device that receives received data; a defining data candidate obtaining device that obtains from the received data at least one candidate for defining data which defines the received data into a plurality of groups based on the number of the input items; a data candidate provisionally determining device that makes provisional determination based on the candidate for the defining data; a first print data producing device that produces first print data by delimiting the received data into a plurality of delimiting data based on the provisional determination by the data candidate provisionally determining device and inputting each of the delimiting data to each of the input items of the template; and a display device that displays a print image of the first print data.

In the printing apparatus of the disclosure, when the printing apparatus receives data, at least one candidate for defining data which defines the received data into a plurality of groups is obtained from the received data based on the number of the input items of the template. The provisional determination is made based on the candidate for the defining data. The first print data is produced by delimiting the received data into a plurality of delimiting data based on the provisional determination and inputting each of the delimiting data to each of the input items. The print image corresponding to the first print data is displayed. Therefore, the user can see the print image of the template where each delimiting data included in the received data is input to each of the input items and the user can check whether or not the template where each delimiting data included in the received data is input to each input item is in an appropriate state.

There is also provided a computer program product that is used and executed by a printing apparatus, comprising: a recording medium that can be read by a computer; and a computer program stored in the recording medium that can be read by the computer, wherein the computer program comprises: a receiving step of receiving received data with a receiving device; a defining data candidate obtaining step of obtaining at least one candidate for defining data which defines the received data into a plurality of groups based on the number of input items of the template that are stored in a template storing device; a data candidate provisionally determining step of making provisional determination based on the candidate for the defining data; a first print data producing step of producing first print data by delimiting the received data into a plurality of delimiting data based on the provisional determination by the data candidate provisionally determining step and inputting each of the delimiting data to each of the input items of the template; and a display step of displaying a print image of the first print data on a display device.

In the computer program product of the disclosure, when the printing apparatus receives data, at least one candidate for defining data which defines the received data into a plurality of groups is obtained from the received data based on the number of the input items of the template. The provisional determination is made based on the candidate for the defining data. The first print data is produced by delimiting the received data into a plurality of delimiting data based on the provisional determination and inputting each of the delimiting data to each of the input items. The print image corresponding to the first print data is displayed. Therefore, the user can see the print image of the template where each delimiting data included in the received data is input to each of the input items and the user can check whether or not the template where each delimiting data included in the received data is input to each input item is in an appropriate state.

BRIEF DESCRIPTION OF THE DRAWINGS

FIG. 2 is a view showing an example of printing preview shown by the printing apparatus according to the present embodiment;

FIG. 16 is a flowchart of another display renewal process.

DETAILED DESCRIPTION

Figure 1:
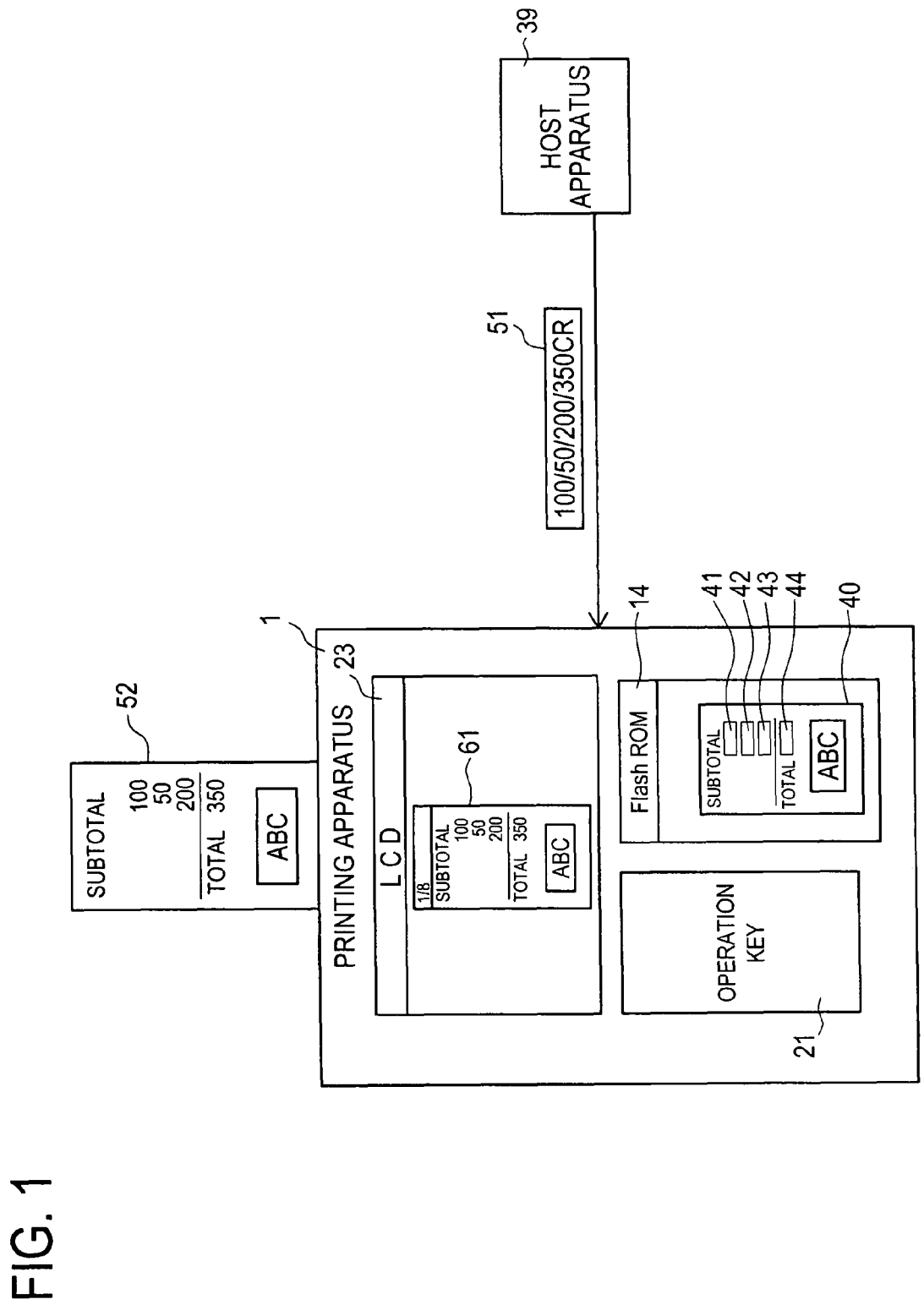
FIG. 1 is a view showing characteristics of a printing apparatus according to an embodiment.

A detailed description of an exemplary embodiment of a printing apparatus of the disclosure will now be given referring to the accompanying drawings. As shown in FIG. 1, in a printing apparatus 1 of the present embodiment, a template 40 having four input items 41, 42, 43, 44 is stored in a flash ROM 14. A print preview 61 is shown on a LCD 23. The print preview 61 shows a state where received data 51 from a host apparatus 39 is input to each of the input items 41, 42, 43, 44 of the template 40.

The received data 51 from the host apparatus 39 (for example, "100/50/200/350CR") includes three delimiters (for example, "/", "/" and "/") for limiting each item data and a print start character string which corresponds to a print start command (specifically, "CR"), in addition to four item data each of which is input to each of the input items 41, 42, 43, 44 of the template 40 (specifically, "100", "50", "200" and "350"). "CR" is an abbreviation of a carriage return code and represents one code. The carriage return code is one of control codes of ASCII code.

However, the printing apparatus 1 of the present embodiment cannot recognize a delimiter or a print start character string included in the received data 51 from the host apparatus 39. Since the number of delimiters included in the received data 51 from the host apparatus 39 is smaller than the number of the input items of the template 40 by one, the printing apparatus 1 of the present embodiment calculates that the received data 51 from the host apparatus 39 includes three delimiters. The printing apparatus 1 obtains a character string (specifically, "/" and "0/"), which is periodically repeated the number of times (three times) same as the number of the delimiters (three), from the received data 51 from the host apparatus 39 and determines the character string as a delimiter candidate. Further, the printing apparatus 1 obtains a print start character string candidate (specifically, "CR", "0CR", "50CR" and "350CR") based on the data group (specifically, "350CR") which is located after the last delimiter candidate in the received data 51 from the host apparatus 39.

A delimiter candidate and a print start character string candidate are provisionally determined. The four item data included in the received data 51 from the host apparatus 39 are presumed with using the provisionally determined candidates for a delimiter and a print start character string. The LCD 23 displays a print preview 61 which shows a state where the four item data are input to the input items 41, 42, 43, 44 of the template 40.

At this time, if the print preview 61 displayed on the LCD 23 is in an appropriate state, the user operates an operation key 21 so as to print a print tape 52 as shown by the print preview 61.

Total number of combinations of the provisionally determined candidates for the delimiter and the print start character string is eight (2*4), since the number of the delimiter candidates (for example, "/" "0/") is two and the number of the print start character string candidates (for example, "CR" "0CR" "50CR" "350CR") is four. Therefore, the number of the print previews displayed on the LCD 23 is also eight. The eight types of print previews are shown in FIG. 2.

The print preview 61A is shown on the LCD 23 when "/" is provisionally determined to be the delimiter candidate and "CR" is provisionally determined to be the print start character string candidate. The print preview 61A is same as the print preview 61 shown in FIG. 1. The print preview 61B is shown on the LCD 23 when "/" is provisionally determined to be the delimiter candidate and "0CR" is provisionally determined to be the print start character sting candidate. The print preview 61C is shown on the LCD 23 when "/" is provisionally determined to be the delimiter candidate and "50CR" is provisionally determined to be the print start character sting candidate. The print preview 61D is shown on the LCD 23 when "/" is provisionally determined to be the delimiter candidate and "350CR" is provisionally determined to be the print start character sting candidate.

The print preview 61E is shown on the LCD 23 when "0/" is provisionally determined to be the delimiter candidate and "CR" is provisionally determined to be the print start character sting candidate. The print preview 61F is shown on the LCD 23 when "0/" is provisionally determined to be the delimiter candidate and "0CR" is provisionally determined to be the print start character sting candidate. The print preview 61G is shown on the LCD 23 when "0/" is provisionally determined to be the delimiter candidate and "50CR" is provisionally determined to be the print start character sting candidate. The print preview 61H is shown on the LCD 23 when "0/" is provisionally determined to be the delimiter candidate and "350CR" is provisionally determined to be the print start character sting candidate.

In the printing apparatus 1 shown in FIG. 1, when the user operates the operation key 21, a combination of the provisionally determined candidates for the delimiter and the print start character string is renewed. Therefore, if the user repeatedly operates the operation key 21, the eight types of the print previews 61 are displayed on the LCD 23 one by one. When the print preview 61 displayed on the LCD 23 is in an appropriate state, the user operates the operation key 21 so as to print the image of the print preview 61 which is in an appropriate state on the print tape 52.

A fractional number is displayed at an upper portion of each print preview 61 so as to specify each of the print previews 61. For example, the fractional number of "1/8" displayed at the upper portion of the print preview 61A means that the displayed print preview is a first type of the eight types of the print previews. The fractional number of "2/8" displayed at the upper portion of the print preview 61B means that the displayed print preview is a second type of the eight types of the print previews. Each of the fractional numbers of "3/8", "4/8", "5/8", "6/8", "7/8" and "8/8" displayed at the upper portion of the print preview 61C, 61D, 61E, 61F, 61G and 61H is similar to the fractional number of "⅛" or "⅖".

Figure 3:
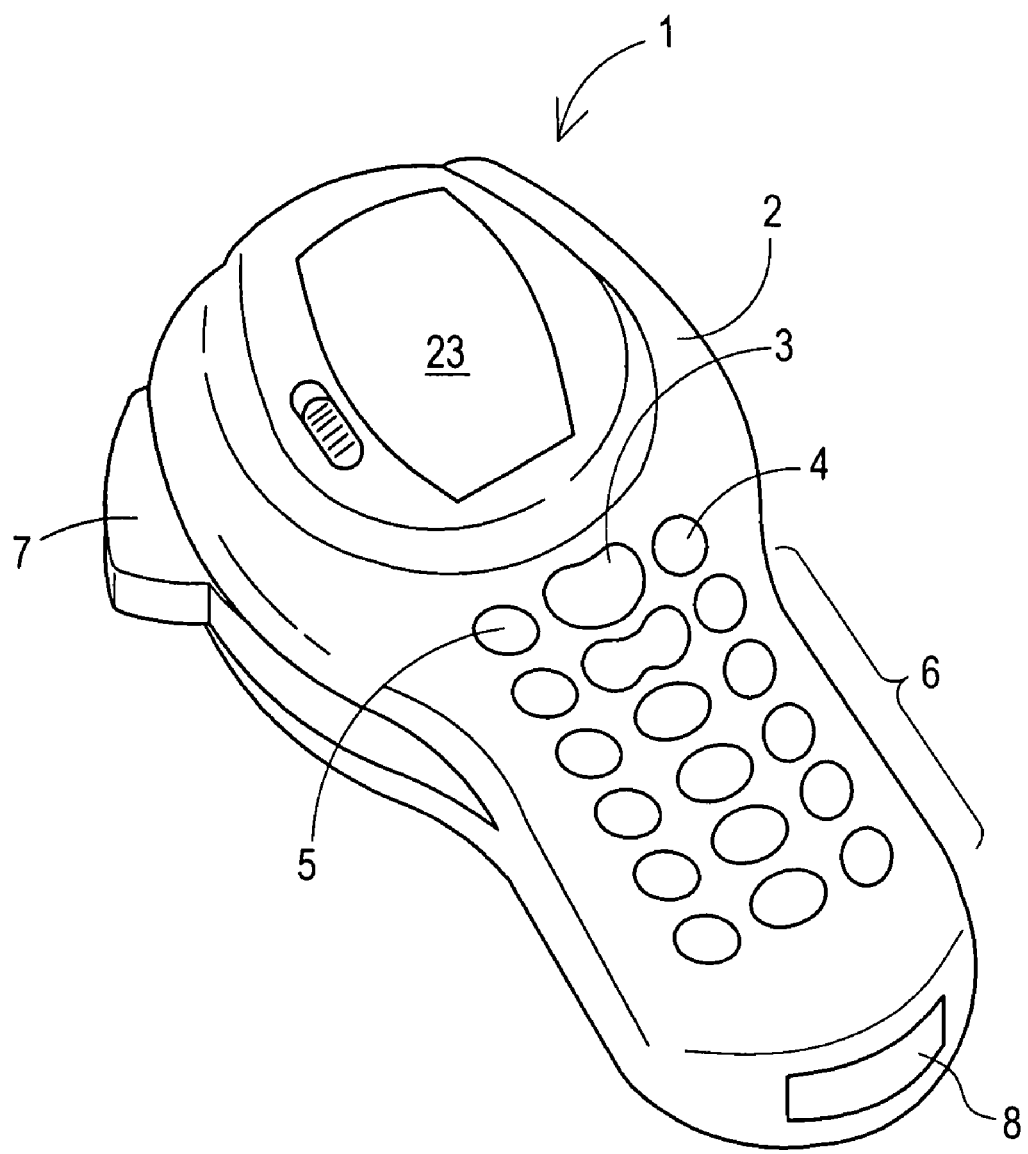
FIG. 3 is a perspective view showing an outer appearance of the printing apparatus according to the present embodiment.

A configuration of the printing apparatus 1 according to the present embodiment will be explained. As shown in FIG. 3, the printing apparatus 1 of the present embodiment is a handy type label printer. A command key 3, an upward key 4, a downward key 5, editing keys 6, a manual lever 7 for cutting a print tape 52, a connection port 8 for receiving a connector of a cable for connecting the printing apparatus 1 to the host apparatus 39 and the like are arranged on a body frame 2 of the printing apparatus 1. The operation key 21 is comprised of the command key 3, the upward key 4, the downward key 5 and the editing keys 6.

Figure 4:
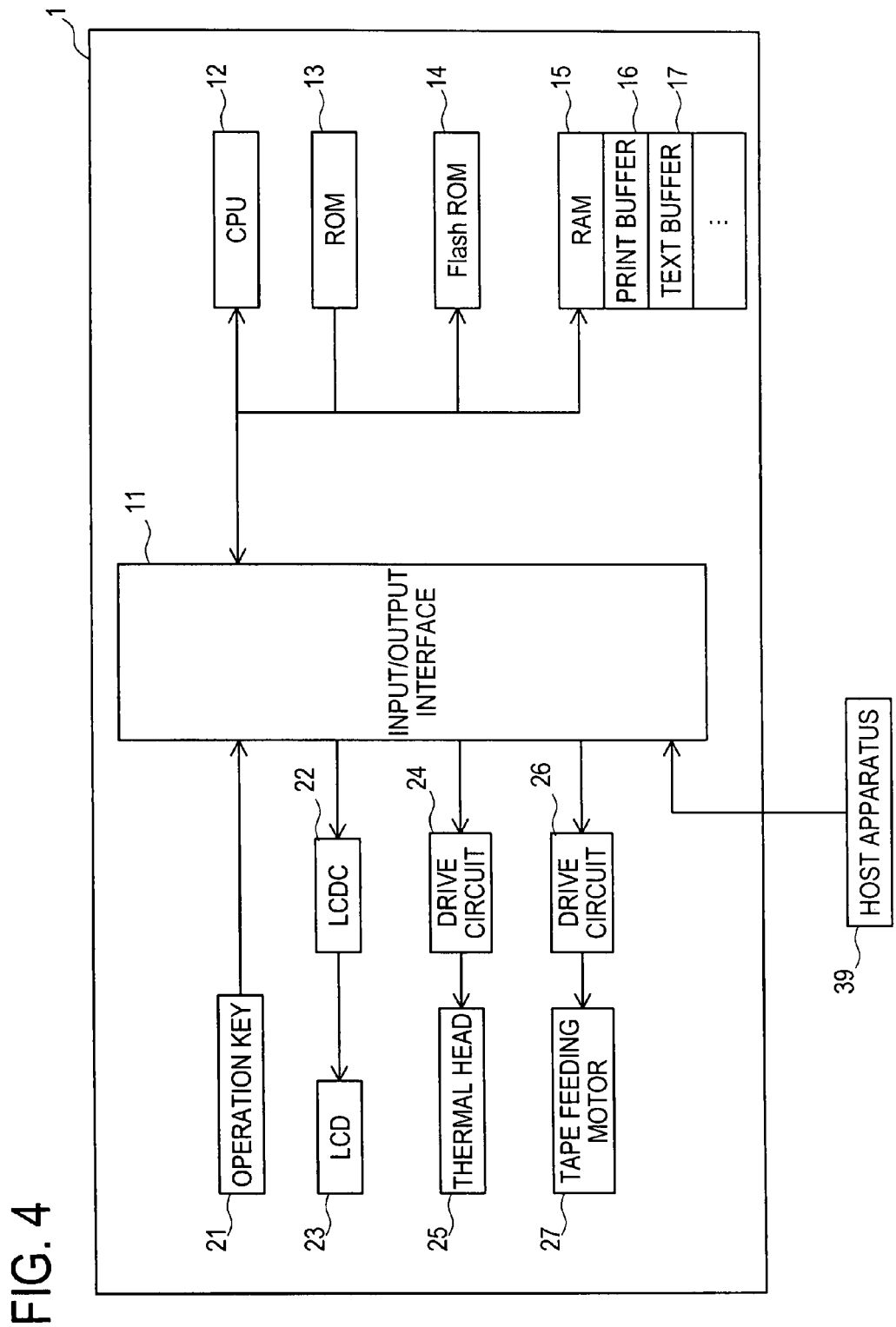
FIG. 4 is a block diagram showing a control system of the printing apparatus according to the present embodiment.

Next, a control system of the printing apparatus 1 of the present embodiment will be explained. As shown in FIG. 4, a CPU 12 for executing each of programs which will be described later, a ROM 13, a flash ROM 14, a RAM 15 and the like are connected to an input/output interface 11 of the printing apparatus 1 of the present embodiment.

The ROM 13 stores various programs which will be described later. The flash ROM 14 stores information relating to the template 40. The RAM 15 includes a print buffer 16, a text buffer 17 and a work area which is used when the CPU 12 executes each of the programs. A mode flag, a variable x, a variable y, a variable i and a variable j are set in the work area.

In the printing apparatus 1 of the present embodiment, the operation key 21, a display controller (referred to LCDC) 22, a drive circuit 24, a drive circuit 26 and the like are connected to the input/output interface 11. The display controller 22 has a display RAM for outputting display data to the LCD 23. The drive circuit 24 drives a thermal head 25. The drive circuit 26 drives a tape feeding motor 27 which feeds the print tape 52 from a print cassette to outside. The host apparatus 39 is connected to the input/output interface 11 via a cable whose connector is inserted to the connection port 8.

Figure 5:
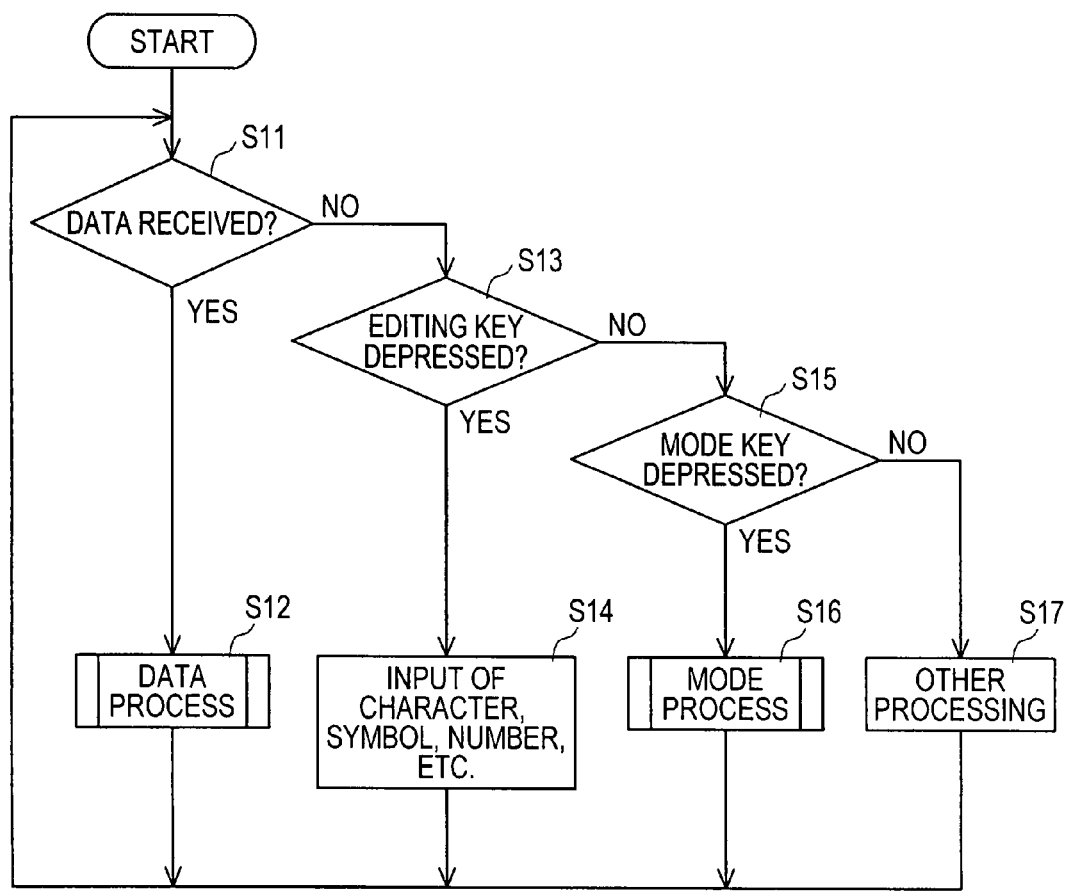
FIG. 5 is a flowchart of a main program.

Next, control operations of the printing apparatus 1 of the present embodiment will be explained. When the CPU 12 reads and executes a main program, it is determined whether or not the CPU 12 receives data from the host apparatus 39 in step S11, as shown in FIG. 5. If it is determined that the CPU 12 received data from the host apparatus 39 (S11: YES), the data processing of step S12 which will be described later is executed and the routine returns to step S11. The CPU 12 stores the received data 51 from the host apparatus 39 in the work area of the RAM 15. On the other hand, if it is determined that the CPU 12 does not receive data from the host apparatus 39 (S11: NO), the routine proceeds to step S13.

In step S13, the CPU 12 determines whether or not the editing key is operated by the user. The editing key means the operation keys 21 except for the command key 3. If it is determined that the editing key is operated by the user (S13: YES), the routine proceeds to step S14. After a character, a number or a symbol is input by the operation of the editing key by the user in step S14, the routine returns to step S11. The input of a character, a number or a symbol by the operation of the editing key by the user means inputting or editing a content to be printed, which has been known, and therefore detailed explanation thereof will be omitted. If it is determined that the editing key is not operated by the user (S13: NO), the routine proceeds to step S15.

In step S15, the CPU 12 determines whether the mode key is operated by the user. The mode key means the command key 3. If it is determined that the mode key is operated by the user (S15: YES), the routine returns to step S11 after executing the mode process of step S16 which will be described later. On the other hand, if it is determined that the mode key is not operated by the user (S15: NO), the routine proceeds to step S17 and returns to step S11 after executing other processes.

Figure 6:
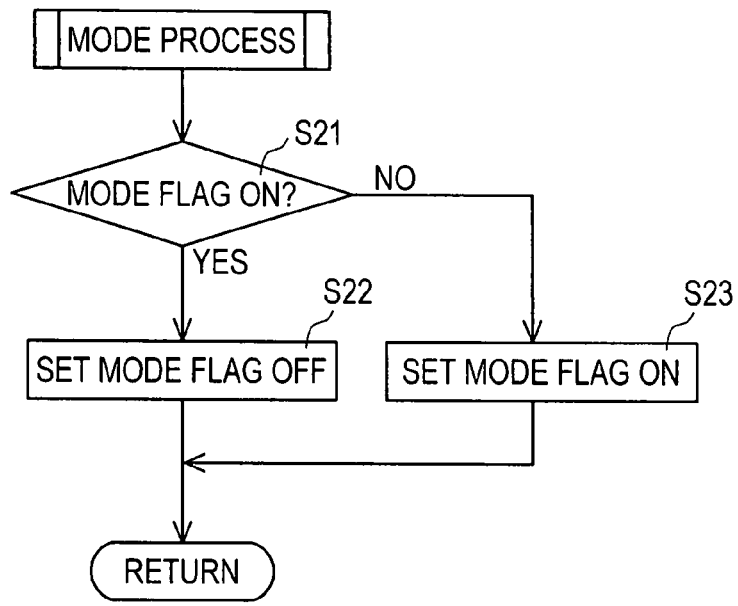
FIG. 6 is a flowchart of a mode process.

The mode process of step S16 will be explained. When the mode process of step S16 is executed in the main program, the CPU 12 determines whether or not the mode flag is on in step S21 shown in FIG. 6. The mode flag is set in the work area of the RAM 15 and the initial state of the mode flag is off. If it is determined that the mode flag is on (S21: YES), the routine proceeds to step S22. In step S22, the CPU 12 sets the mode flag to be off and the routine returns to step S11 in the main program. On the other hand, if it is determined that the mode flag is not on (S21: NO), the routine proceeds to step S23. In step S23, the CPU 12 sets the mode flag to be on and the routine returns to step S11 in the main program.

The data processing of step S12 in the main program will be explained. When the data processing of step S12 in the main program is executed, the CPU 12 determines whether or not the mode flag is on in step S31 shown in FIG. 7.

If it is determined that the mode flag is on (S31: YES), the routine proceeds to step S32. In step S32, the CPU 12 executes the print command analysis process and the routine returns to step S11 in the main program. On the other hand, if it is determined that the mode flag is not on (S31: NO), the routine proceeds to step S33. In step S33, the CPU 12 executes the print data producing process which will be described later and the routine proceeds to step S34. In step S34, the CPU 12 executes a normal printing operation and the routine returns to step S11 in the main program. During the normal printing operation, the CPU 12 drives the tape feeding motor 27 via the drive circuit 26 so as to feed the print tape 52 to the outside of the print cassette and the CPU 12 prints the print image, which is developed in the print buffer 16, on the print tape 52 stored in the print cassette with the thermal head 25 which is driven via the drive circuit 24.

Figure 7:
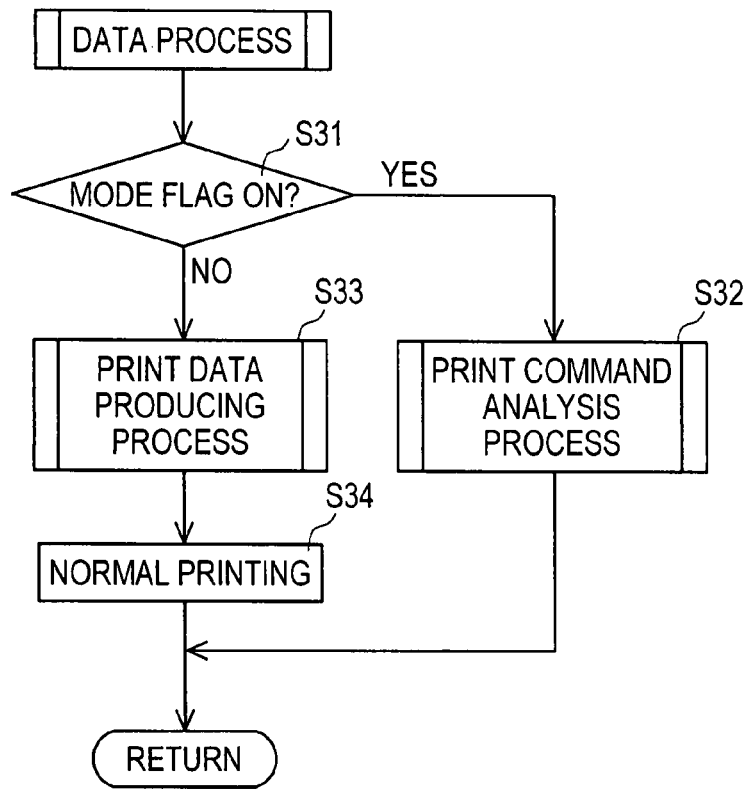
FIG. 7 is a flowchart of a data process.

Next, the print command analysis processing of step S32 in the data processing shown in FIG. 7 will be explained. If the print command analysis processing of step S32 in the data processing shown in FIG. 7 is executed, the CPU 12 obtains the number of delimiters from the template 40 in step S41, shown in FIG. 8. In the case of FIG. 1, the CPU 12 obtains the number (three) which is smaller than the number (four) of the input items 41, 42, 43, 44 of the template 40 by one as the number of delimiters included in the received data 51 from the host apparatus 39.

The template 40 is selected in the other processing of step S17 in the main program shown in FIG. 5.

Thereafter, the routine proceeds to step S42 and the CPU 12 determines whether or not the number of delimiters is two or more. If it is determined that the number of delimiters is smaller than two (S42: NO), the routine proceeds to the delimiter character string candidate determining process of step S46 which will be described later. On the other hand, it is determined that the number of delimiters is two or more (S42: YES), the routine proceeds to step S43. In the case of FIG. 1, the received data 51 from the host apparatus 39 has three delimiters (S41) and the routine proceeds to step S43.

In step S43, the CPU 12 determines whether or not character strings of the same number as the number of delimiters are periodically included in the received data 51 from the host apparatus 39. If it is determined that character strings of the same number as the number of delimiters are periodically included in the receive data 51 (S43: YES), the routine proceeds to the delimiter character string candidate determining process of step S46 which will be described below. In the case of FIG. 1, since the character string of "/" or "0/" is periodically included in the received data 51, the routine proceeds to the delimiter character string candidate determining process of step S46. On the other hand, if it is determined that character strings of the same number as the number of delimiters are not periodically included in the received data 51 (S43: NO), the routine proceeds to step S44.

In step S44, the CPU 12 displays an error on the LCD 23. Thereafter, the CPU 12 waits until any one of the operation keys 21 is depressed in step S45 (S45: NO). If it is determined that any one of the operation keys 21 is depressed (S45:YES), the routine returns to step S11 in the main program.

If it is determined that the number of delimiters is less than two in step S42 (S42: NO) or that character strings of the same number as the number of delimiters are periodically included in the received data in step S43 (S43: YES), the routine proceeds to the delimiter character string candidate determining process of step S46. The delimiter character string candidate determining process of step S46 will be explained.

Figure 8:
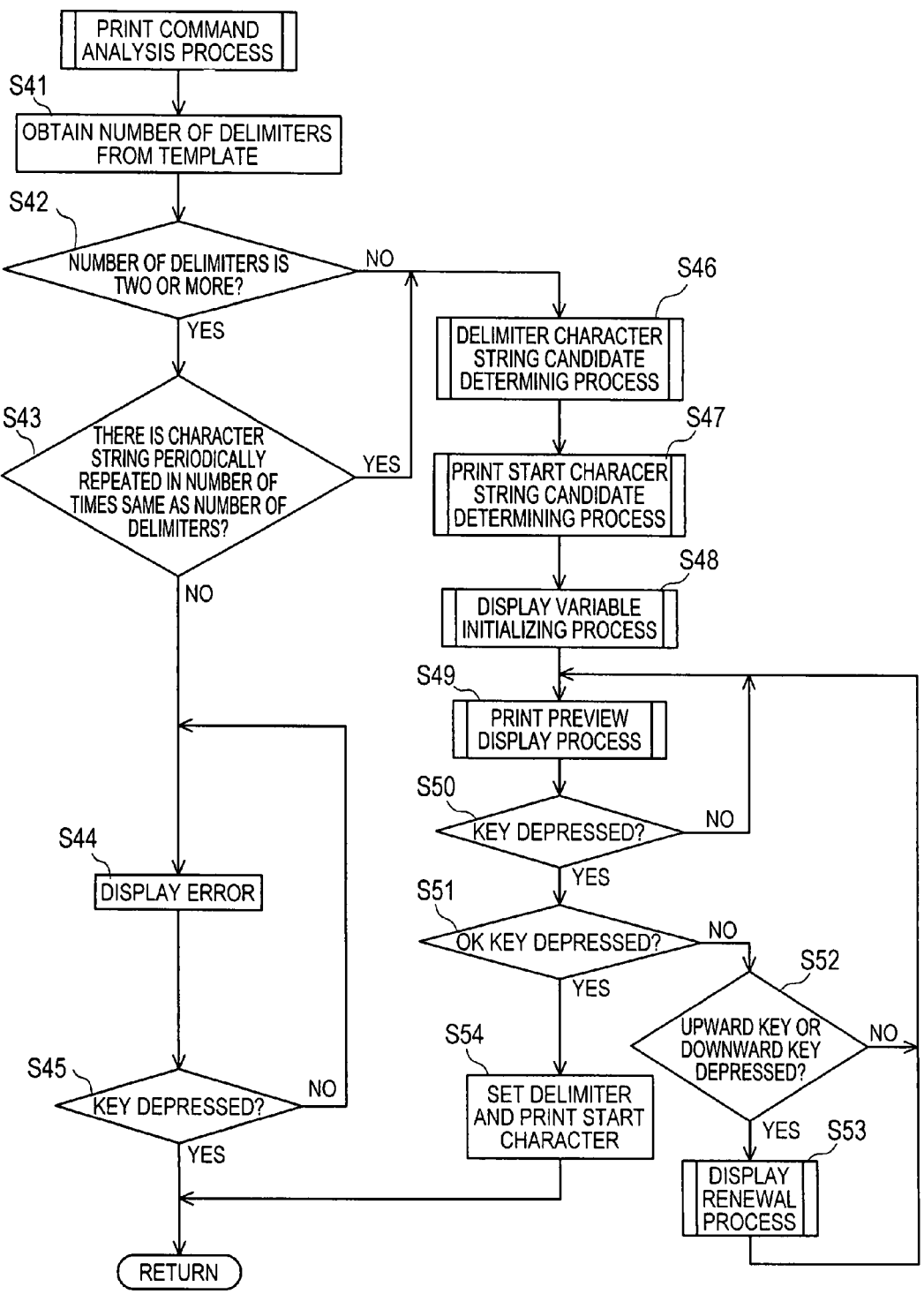
FIG. 8 is a flowchart of a print command analysis process.
Figure 9:
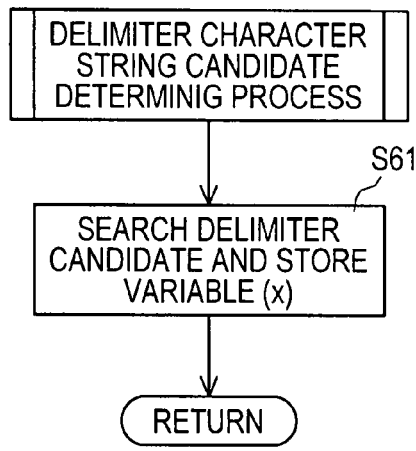
FIG. 9 is a flowchart of a delimiter character string candidate determination process.

When the delimiter character string candidate determining process of step S46 is executed in step S61 shown in FIG. 9, the CPU 12 searches a delimiter candidate and stores the searched delimiter candidate in the work area of the RAM 15 and stores the number of the searched delimiter candidates in the variable x which is set in the work area of the RAM 15. The delimiter candidate is a character string which is an object for the determination of step S43 in FIG. 8. Therefore, in the case of FIG. 1, "/" or "0/" is a delimiter candidate and the number of delimiter candidates is two.

Thereafter, the routine returns to the print command analysis process of FIG. 8 and proceeds to the print start character string candidate determining process of step S47. The print start character string candidate determining process of step S47 will be explained.

Figure 10:
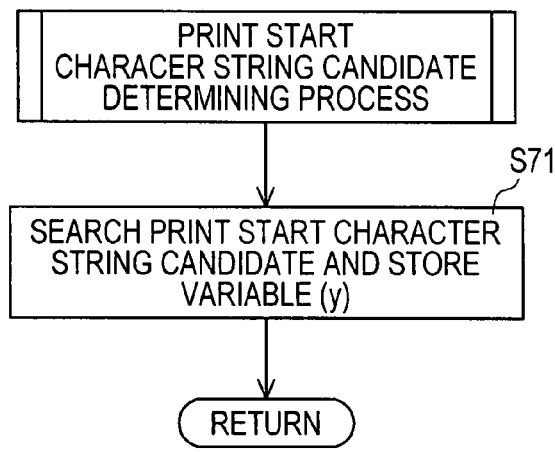
FIG. 10 is a flowchart of a print start character string candidate determination process.

When the print start character string candidate determining process of step S47 is executed in step S71 shown in FIG. 10, the CPU 12 searches a print start character string candidate and stores the searched candidate in the work area of the RAM 15 and stores the number of the searched print start character string candidates in the variable y which is set in the work area of the RAM 15. A print start character string candidate is obtained from a data group which is located after a last delimiter candidate in the received data. In the case of FIG. 1, considering that "/" or "0/" is a delimiter candidate, "CR", "0CR", "50CR" and "350CR" are the print start character string candidates and the number of the print start character string candidates is four.

Thereafter, the routine returns to the print command analysis process of FIG. 8 and proceeds to the display variable initialization process of step S48. The display variable initialization process of step S48 will be explained.

Figure 11:
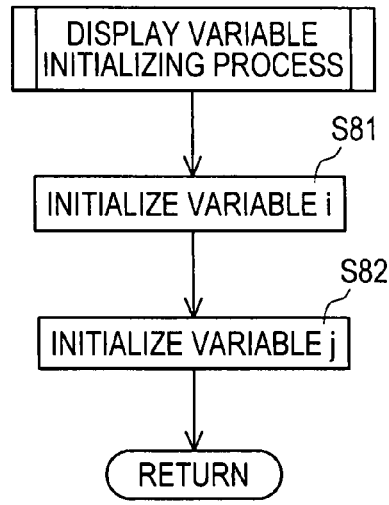
FIG. 11 is a flowchart of a display variable initializing process.

When the display variable initialization process of step S48 is executed, the CPU 12 initializes the variable i which is set in the work area of the RAM 15 in step S81 shown in FIG. 11. At this time, the CPU 12 determines correlation between a delimiter candidate and the variable i and stores the determined correlation in the work area of the RAM 15. In the case of FIG. 1, for example, "0" corresponds to the value of the variable i with respect to the delimiter candidate "/", and "1" corresponds to the value of the variable i with respect to the delimiter candidate "0/". When the routine proceeds to step S82, the CPU 12 initializes the variable j which is set in the work area of the RAM 15. The CPU 12 determines correlation between a print start character string candidate and the variable j and stores the determined correlation in the work area of the RAM 15. In the case of FIG. 1, for example, "0" corresponds to the value of the variable j with respect to the print start character string candidate "CR". "1" corresponds to the value of the variable j with respect to the print start character string candidate "0CR". "2" corresponds to the value of the variable j with respect to the print start character string candidate "50CR". "3" corresponds to the value of the variable j with respect to the print start character string candidate "350CR". When the variables i and j are initialized, "0" is set to the variables i and j.

The values of the variables i and j are also used for displaying fractions at the upper portion of the print preview 61 (see FIG. 2).

Thereafter, the routine returns to the print command analysis process of FIG. 8 and proceeds to the print preview display process of step S49. The print preview display process of step S49 will be explained.

Figure 12:
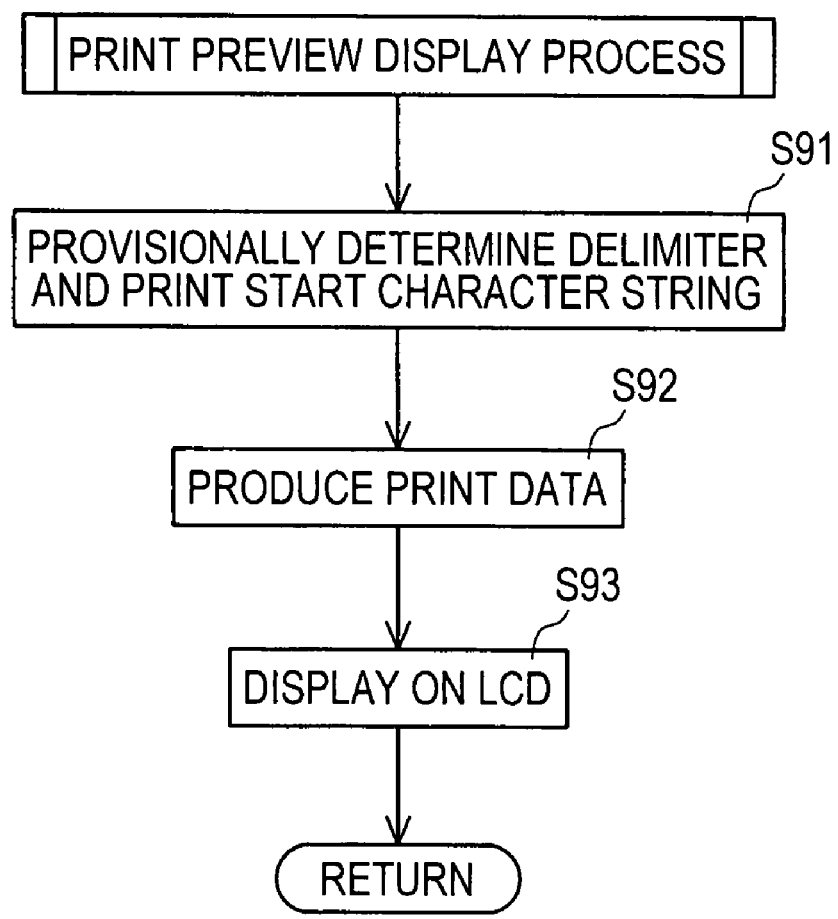
FIG. 12 is a flowchart of a print preview display process.

When the print preview display process of step S49 is executed, the CPU 12 provisionally determines a delimiter and a print start character string in step S91 of FIG. 12. The CPU 12 provisionally determines a delimiter candidate corresponding to the value of the variable i and a print start character string candidate corresponding to the value of the variable j. For example, when the value of the variable i is "0", a corresponding candidate for the delimiter "/" is provisionally determined. When the value of the variable j is "0", a corresponding candidate for the print start character string "CR" is provisionally determined.

When the routine proceeds to step S92, the CPU 12 produces print data. That is, the CPU 12 inputs the received data to the input item 41 of the template 40 from its beginning to data which is located just before a provisionally determined delimiter candidate (first candidate). Then, the CPU 12 inputs the received data to the input item 42 of the template 40 from data which is located just after the delimiter candidate (first candidate) to data which is located just before the provisionally determined delimiter candidate (second candidate). Then, the CPU 12 inputs the received data to the input item 43 of the template 40 from data which is located just after the delimiter candidate (second candidate) to data which is located just before the provisionally determined delimiter candidate (third candidate). Further, the CPU 12 inputs the received data to the input item 43 of the template 40 from data which is located just after the delimiter candidate (third candidate) to data which is located just before a provisionally determined print start character string candidate. The CPU 12 stores thus produced print data in the text buffer 17. Then, the CPU 12 develops a print image in the print buffer 16 based on the print data.

Thereafter, when the routine proceeds to step S93, the CPU 12 displays a print preview of the print image which is developed in the print buffer 16 on the LCD 23.

Specifically, in the case of FIG. 1, when a candidate for the delimiter "/" is provisionally determined and a candidate for the print start character string "CR" is provisionally determined, the CPU 12 inputs the received data 51 ("100/50/200/350CR") from the host apparatus 39 to the input item 41 of the template 40 from its beginning data of "1" to the data of "0" which is located just before the provisionally determined candidate for the delimiter "/" (first candidate). As a result, data of "100" is input to the input item 41 of the template 40. Then, the CPU 12 inputs the received data 51 ("100/50/200/350CR") from the host apparatus 39 to the input item 42 of the template 40 from the data of "5" which is located just after the candidate for the delimiter "/" (first candidate) to the data of "0" which is located just before the provisionally determined candidate for the delimiter "/" (second candidate). As a result, data of "50" is input to the input item 42 of the template 40. Then, the CPU 12 inputs the received data 51 ("100/50/200/350CR") from the host apparatus 39 to the input item 43 of the template 40 from the data of "2" which is located just after the candidate for the delimiter "/" (second candidate) to the data of "0" which is located just before the provisionally determined candidate for the delimiter "/" (third candidate). As a result, data of "200" is input to the input item 43 of the template 40. Further, the CPU 12 inputs the received data 51 ("100/50/200/350CR") from the host apparatus 39 from the data of "3" which is located just after the candidate for the delimiter "/" (third candidate) to the data of "0" which is located just before the provisionally determined candidate for the print start character sting "CR". As a result, the data of "350" is input to the input item 44 of the template 40.

Thus produced print data is stored in the text buffer 17 and a print image which is produced based on the print data is developed in the print buffer 16. The print preview 61A of the print image is displayed on the LCD 23.

Thereafter, the routine returns to the print command analysis process of FIG. 8 and proceeds to step S50. In step S50, the CPU 12 waits until any one of the operation keys 21 is depressed (S50: NO). When any one of the operation keys 21 is depressed (S50: YES), the routine proceeds to step S51.

In step S51, the CPU 12 determines whether or not the operation key 21 depressed in step S50 is an OK key. The OK key is a command key 3 (commonly used with the mode key). If it is determined that the operation key 21 depressed in step S50 is not an OK key (S51: NO), the routine proceeds to step S52.

In step S52, the CPU 12 determines whether or not the upward key 4 or the downward key 5 is depressed. If none of the upward key 4 and the downward key 5 is depressed (S52: NO), the routine returns to step S49. On the other hand, if it is determined that any one of the upward key 4 and the downward key 5 is depressed (S52: YES), the routine proceeds to the display renewal process of step S53.

The display renewal process of step S53 will be explained. When the display renewal process of step S53 is executed, the CPU 12 determines whether or not the upward key 4 is depressed in step S101 of FIG. 13. If it is determined that the upward key 4 is depressed (S101: YES), the routine proceeds to step S102. In step S102, the CPU 12 determines whether or not the value of the variable i is smaller than the value obtained by subtracting "1" from the value of the variable x. If it is determined that the value of the variable i is smaller than the value obtained by subtracting "1" from the value of the variable x (S102: YES), the routine proceeds to step S103. In step S103, the CPU 12 increments the value of the variable i. Then, the routine returns to the print command analysis process of FIG. 8 and proceeds to the print preview display process of step S49.

On the other hand, in step S102, if it is determined that the value of the variable i is equal to or greater than the value obtained by subtracting "1" from the value of variable x (S102: NO), the routine proceeds to step S104. In step S104, the CPU 12 determines whether or not the value of the variable j is smaller than the value obtained by subtracting "1" from the value of the variable y. If it is determined that the value of the variable j is smaller than the value obtained by subtracting "1" from the value of the variable y (S104: YES), the routine proceeds to step S105. In step S105, the CPU 12 initializes the variable i and increments the value of the variable j. Thereafter, the routine returns to the print command analysis process of FIG. 8 and proceeds to the print preview display process of step S49.

In step S104, it is determined that the value of the variable j is equal to or greater than the value obtained by subtracting "1" from the value of the variable y (S104: NO), the routine proceeds to step S106. In step S106, the CPU 12 initializes the variables i and j. Thereafter, the routine returns to the print command analysis process of FIG. 8 and proceeds to the print preview display process of step S49.

In step S101, when it is determined that the upward key 4 is not depressed (S101: NO), the routine proceeds to step S107. In step S107, the CPU 12 determines whether or not the value of the variable i is greater than "0". If it is determined that the value of the variable i is greater than "0" (S107: YES), the routine proceeds to step S108. In step S108, the CPU 12 decrements the value of the variable i. Thereafter, the routine returns to the print command analysis process of FIG. 8 and proceeds to the print preview display process of step S49.

In step S107, if it is determined that the value of variable i is "0" (S107: NO), the routine proceeds to step S109. In step S109, the CPU 12 determines whether or not the value of the variable j is greater than "0". If it is determined that the value of the variable j is greater than "0" (S109: YES), the routine proceeds to step S110. In step S110, the CPU 12 sets the value obtained by subtracting "1" from the value of variable x to the variable i and decrements the value of the variable j. Thereafter, the routine returns to the print command analysis process of FIG. 8 and proceeds to the print preview display process of step S49.

In step S109, if it is determined that the value of the variable j is "0" (S109: NO), the routine proceeds to step S111. In step S111, the CPU 12 sets the value obtained by subtracting "1" from the value of variable x to the variable i and sets the value obtained by subtracting "1" from the value of the variable y to the variable j. Thereafter, the routine returns to the print command analysis process of FIG. 8 and proceeds to the print preview display process of step S49.

Therefore, when the display renewal process is executed in the case of FIG. 1, by depression of the upward key 4 or the downward key 5, each of the values (i, j) of the variables i and j is set to be any of combinations of (0, 0), (0, 1), (0, 2), (0, 3), (1, 0), (1, 1), (1, 2) and (1, 3). By executing the display renewal process, each of the values (i, j) of the variables i and j is renewed. Thereafter, the routine returns to the print command analysis process of FIG. 8 and proceeds to the print preview display process of step S49. When step S91 in FIG. 12 is executed, the provisionally determined delimiter and print start character string is renewed.

The routine returns to the print command analysis process of FIG. 8 and if it is determined that the operation key 21 depressed in step S50 is an OK key in step S51 (S51: YES), the routine proceeds to step S54. In step S54, the CPU 12 sets the provisionally determined current delimiter candidate as the delimiter and sets the provisionally determined current print start character string candidate as the print start character string. Thereafter, the routine returns to step S11 of the main program.

Figure 14:
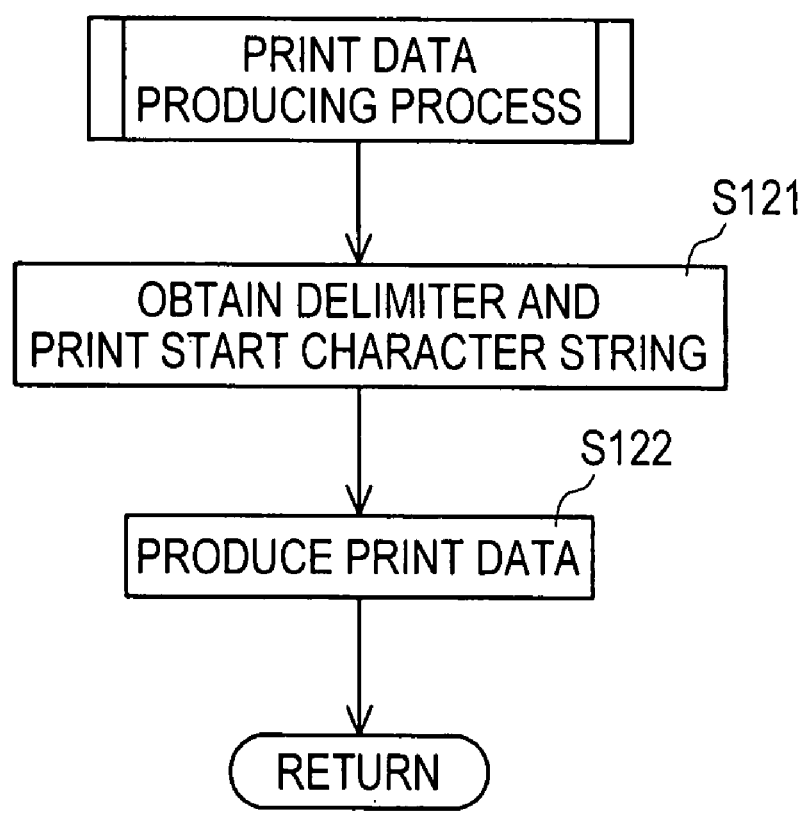
FIG. 14 is a flowchart of a print data producing process.

The print data producing process of step S33 in the data processing of FIG. 7 will be explained. When the print data producing process of step S33 is executed, the CPU 12 obtains the delimiter and the print start character string in step S121 as shown in FIG. 14. The obtained delimiter and print start character string are the ones set in step S54.

Thereafter, the CPU 12 proceeds to step S122 and produces print data. The CPU 12 inputs the received data to the input item 41 of the template 40 from its beginning to the data which is located just before the obtained delimiter (first delimiter). The CPU 12 inputs the received data to the input item 42 of the template 40 from the data which is located just after the delimiter (first delimiter) to the data which is located just before the obtained delimiter (second delimiter). The CPU 12 inputs the received data to the input item 43 of the template 40 from the data which is located just after the delimiter (second delimiter) to the data which is located just before the obtained delimiter (third delimiter). Further, the CPU 12 inputs the received data to the input item 44 of the template 40 from the data which is located just after the delimiter (third delimiter) to the data which is located just before the obtained print start character string. The CPU 12 stores thus produced print data in the text buffer 17. Thereafter, the CPU 12 develops a print image based on the print data in the print buffer 16.

Specifically, in the case of FIG. 1, when the delimiter of "/" is set and the print start character string of "CR" is set, the CPU 12 inputs the received data 51 ("100/50/200/350CR") from the host apparatus 39 to the input item 41 of the template 40 from its beginning data of "1" to the data of "0" which is located just before the set delimiter "/" (first delimiter). As a result, the data of "100" is input to the input item 41 of the template 40. The CPU 12 inputs the received data 51 ("100/50/200/350CR") from the host apparatus 39 to the input item 42 of the template 40 from the data of "5" which is located just after the delimiter "/" (first delimiter) to the data of "0" which is located just before the set delimiter "/" (second delimiter). As a result, the data of "50" is input to the input item 42 of the template 40. The CPU 12 inputs the received data 51 ("100/50/200/350CR") from the host apparatus 39 to the input item 43 of the template 40 from the data of "2" which is located just after the delimiter "/" (second delimiter) to the data of "0" which is located just before the set delimiter "/" (third delimiter). As a result, the data of "200" is input to the input item 43 of the template 40. Further, The CPU 12 inputs the received data 51 ("100/50/200/350CR") from the host apparatus 39 to the input item 44 of the template 40 from the data of "3" which is located just after the delimiter "/" (third delimiter) to the data of "0" which is located just before the print start character string "CR". As a result, the data of "350" is input to the input item 44 of the template 40. Thus produced print data is stored in the text buffer 17 and a print image which is produced based on the print data is developed in the print buffer 16.

Thereafter, the routine returns to the data processing of FIG. 7 and proceeds to step S34. In step S34, the print image developed in the print buffer 16 is printed on a print tape 52, as described above. Thereafter, the routine returns to step S11 of the main program shown in FIG. 5.

As described above, in the printing apparatus 1 of the present embodiment, if the CPU 12 receives data 51 (specifically, "100/50/200/350CR") from the host apparatus 39 (S11: YES), the CPU 12 obtains from the received data 51 a delimiter candidate for defining the received data 51 into a plurality of groups (S61). The number of the delimiters included in the received data 51 (three) must be less than the number of the input items 41, 42, 43, 44 of the template 40 (four) by one. The character string, which is periodically repeated in the received data 51 (specifically, "/" and "0/") the same number of times (three times) as the number of the delimiters (three) which is calculated based on the number of the input items 41, 42, 43, 44 of the template 40 (four), is searched. The searched character string is set to be a delimiter candidate.

Further, candidates for a print start character string which represents an end of the received data 51 (specifically, "CR", "0CR", "50CR" and "350CR") are obtained from a data group which is located after the last delimiter candidate in the received data 51 (specifically, "350CR") (S71). Thereafter, each of a delimiter candidate and a print start character string candidate is provisionally determined (S91). Based on the provisionally determined delimiter candidate and the provisionally determined print start character string candidate, the received data 51 is delimited so as to be input to the input items 41, 42, 43, 44 of the template 40. Thereby, the print data is produced. A print image is produced based on the thus produced print data and the print image is developed in the print buffer 16 (S92). The print preview 61 according to the print image is displayed on the LCD 23 (S93).

Therefore, the user can check whether or not the print data which is produced based on the provisionally determined delimiter candidate and the provisionally determined print start character string candidate is appropriate by seeing the print preview 61 displayed on the LCD 23.

Since the print data is produced based on the print start character string candidate, the print start character string in the received data 51 is not input to the input items 41, 42, 43, 44 of the template 40. Therefore, the produced print data is likely to be in a state where the received data 51 is appropriately input to the input items 41, 42, 43, 44 of the template 40.

In the printing apparatus 1 of the present embodiment, if the user depresses the upward key 4 or the downward key 5 (S52: YES), the value of the variable i corresponding to each delimiter candidate or the value of the variable j corresponding to each print start character string candidate is changed (S53), and thereby the provisionally determined delimiter candidate or the provisionally determined print start character string candidate is also changed (S91). New print data is produced based on the changed delimiter candidate or the changed print start character string candidate. A print image is produced based on the newly produced print data and the print image is developed in the print buffer 16 (S92). The print preview 61 based on the print image is displayed on the LCD 23 (S93).

Therefore, if the user checks the print preview 61 displayed on the LCD 23 and determines that the print data produced based on the provisionally determined delimiter candidate and the provisionally determined print start character string candidate is not appropriate, the user depresses the upward key 4 or the downward key 5 so as to change the delimiter candidate or the print start character string candidate. Accordingly, the print preview 61 of the print data which is newly produced based on the changed delimiter candidate and the changed print start character string candidate. Thus, the delimiter candidate or the print start character string candidate is changed until appropriate print data is produced based on a delimiter candidate and a print start character string candidate.

In the printing apparatus 1 of the present embodiment, if the user depresses the command key 3 (S51: YES), the current delimiter candidate is set to be a delimiter and the current print start character string candidate is set to be a print start character string (S54). Print data is produced based on the set delimiter and print start character string (S122). Thus produced print data is stored in the text buffer 17 and a print image produced based on the print data is developed in the print buffer 16 and printed on a print tape 52 (S34).

If the user checks the print preview 61 displayed on the LCD 23 and determines that the print data produced based on the delimiter candidate and the print start character string candidate is appropriate, the user depresses the command key 3 so as to print the template 40 where the received data 51 is appropriately input to the input items 41, 42, 43, 44 on a print tape 52. Therefore, the user is not required to know the delimiter and the print start character string included in the received data 51 and the user is not required to preliminary set a delimiter and a print start character string included in the received data 51 to the printing apparatus 1. Further, if the user depresses the command key 3 once, a delimiter candidate and a print start character string candidate which produce appropriate print data are specified. Therefore, the template 40 where the received data 51 is appropriately input to the input items 41, 42, 43, 44 is printed on a print tape 52 without repeating the depression of the command key 3.

The disclosure may be embodied in other specific forms without departing from the sprit or essential characteristics thereof.

Figure 13:
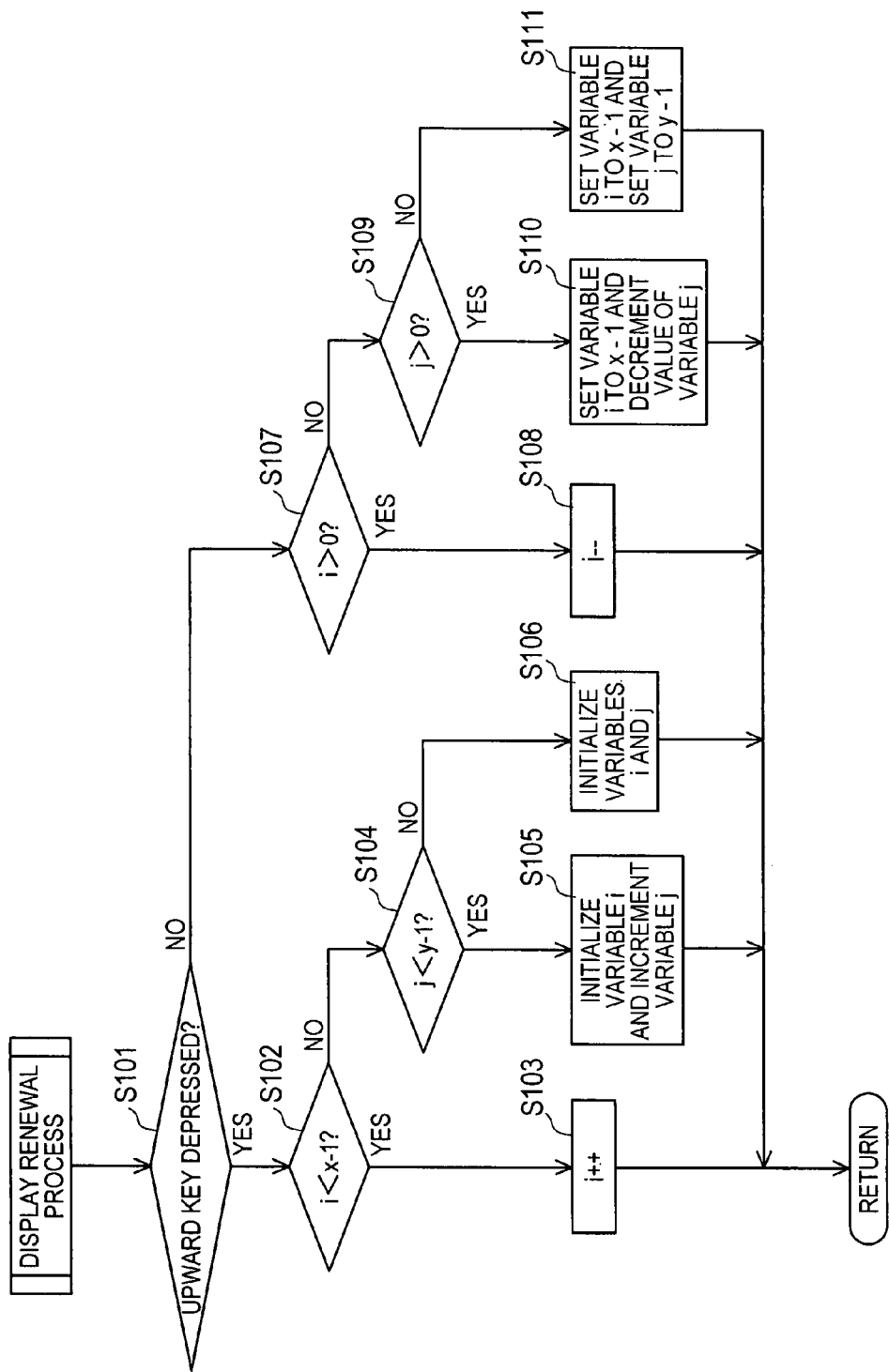
FIG. 13 is a flowchart of a display renewal process.
Figure 15:
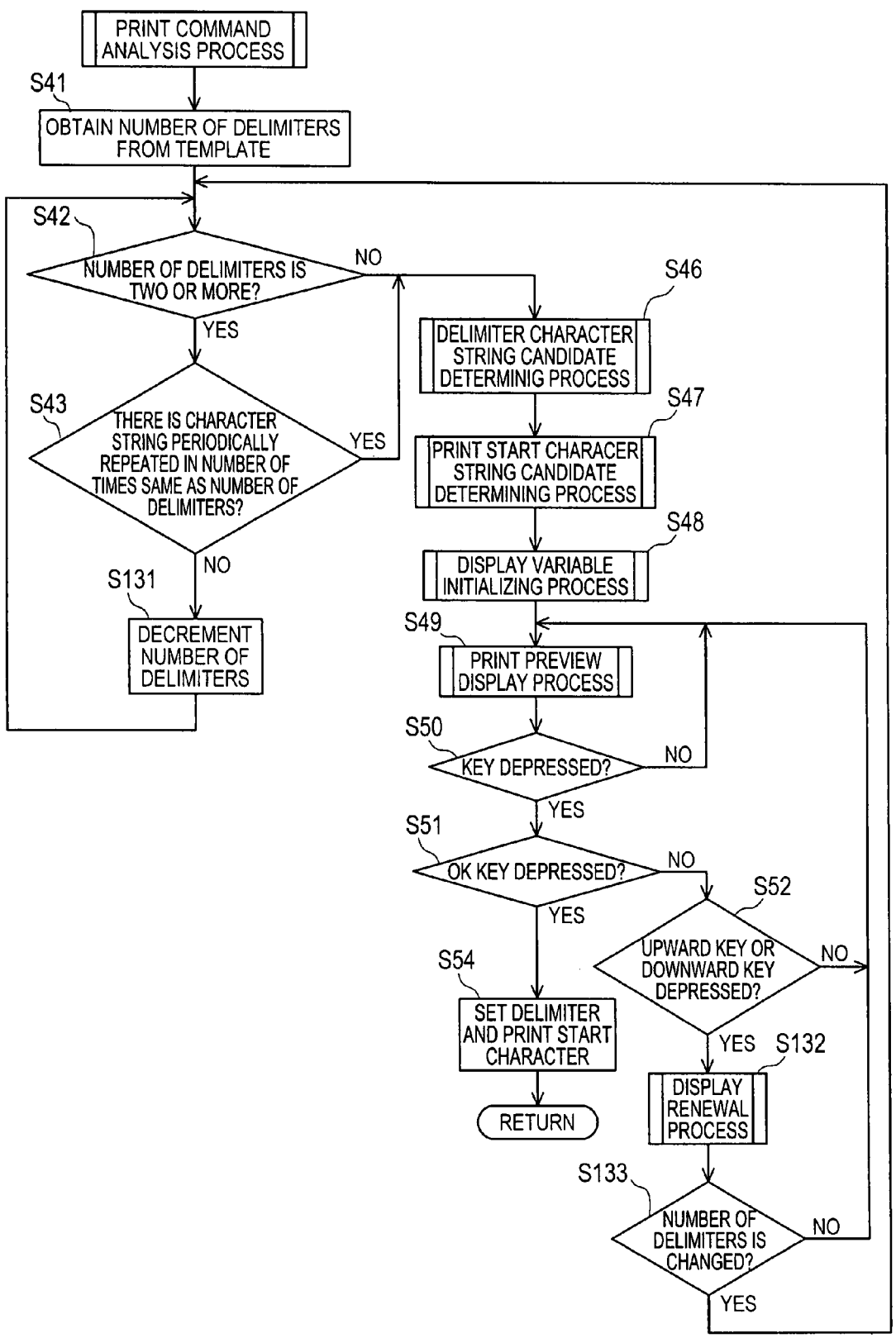
FIG. 15 is a flowchart of another print command analysis process.

For example, in the printing apparatus 1 of the present embodiment, instead of the print command analysis process of FIG. 8 or the display renewal process of FIG. 13, the print command analysis process of FIG. 15 or the display renewal process of FIG. 16 may be executed. The print command analysis process of FIG. 15 or the display renewal process of FIG. 16 will be explained. Same symbols and numbers are applied to the parts which are common to the print command analysis process of FIG. 8 or the display renewal process of FIG. 13 and the explanation thereof will be omitted and only the different parts will be explained.

In the print command analysis process of FIG. 15, if the CPU 12 determines that the character strings of the same number as the number of the delimiters are not periodically included in the received data in step S43 (S43: NO), the routine proceeds to step S131. In step S131, the number of the delimiters is decremented and the routine returns to step S42. If the CPU 12 determines that the upward key 4 or the downward key 5 is depressed in step S52 (S52: YES), the routine proceeds to a display renewal process of step S132. The display renewal process of step S132 corresponds to the display renewal process of FIG. 16.

In the display renewal process of FIG. 16, after the CPU 12 initializes the variables i and j in step S106, the routine proceeds to step S141. In step S141, the CPU 12 determines whether or not the number of delimiters is an uppermost value. The uppermost value is the number of delimiters (three) obtained in step S41 of the print command analysis process of FIG. 15. If the CPU 12 determines that the number of delimiters is the uppermost value (S141: YES), the routine proceeds to step S142. In step S142, the CPU 12 sets the number of delimiters to "0". Then, the routine returns to the print command analysis process of FIG. 15 and proceeds to step S133 which will be described later. On the other hand, in step S141, if the CPU 12 determines that the number of delimiters is not the uppermost value (S141: NO), the routine proceeds to step S143. In step S143, the CPU 12 increments the number of delimiters. Then, the routine returns to the print command analysis process of FIG. 15 and proceeds to step S133 which will be described later.

In the display renewal process of FIG. 16, if the CPU 12 determines that the value of the variable j is "0" in step S109 (S109: NO), the routine proceeds to step S144. In step S144, the CPU 12 initializes the variables i and j and the routine proceeds to step S145. In step S145, the CPU 12 determines whether or not the number of delimiters is a lowermost value. The lowermost value is "0". If the CPU 12 determines that the number of delimiters is the lowermost value (S145: YES), the routine proceeds to step S146. In step S146, the CPU 12 sets the number of delimiters to the maximum value (uppermost value). Then, the routine returns to the print command analysis process of FIG. 15 and proceeds to step S133 which will be described later. On the other hand, in step S145, if the CPU 12 determines that the number of delimiters is not the lowermost value (S145: NO), the routine proceeds to step S147. In step S147, the CPU 12 decrements the number of delimiters. Then, the routine returns to the print command analysis process of FIG. 15 and proceeds to step S133 which will be described later.

When the routine returns to the print command analysis process of FIG. 15 and proceeds to step S133, the CPU 12 determines whether or not the number of delimiters is changed. In step S133, it is determined whether or not the number of delimiters is changed at the display renewal process of FIG. 16. If it is determined that the number of delimiters is changed (S133: YES), the routine returns to step S42. On the other hand, if it is determined that the number of delimiters is not changed (S133: NO), the routine returns to step S49.

Then, when the print command analysis process of FIG. 15 or the display renewal process of FIG. 16 is executed, the received data 51 can be input to the input items 41, 42, 43, 44 of the template 40 with the number of delimiters which is smaller than the number of delimiters (three) which is calculated based on the number of the input items 41, 42, 43, 44 of the template 40 (four). Consequently, the received data 51 may not be input to some of the input items 41, 42, 43, 44. However, the data which has already input is used since the print data is produced by maintaining the data which has been already input.

In the printing apparatus 1 of the present embodiment, in step S51 of the print command analysis process of FIG. 8 or FIG. 15, if it is determined that the operation key 21 depressed in step S50 is an OK key (S51: YES), the print image which is developed in the print buffer 16 may be printed on a print tape 52 instead of executing step S54. In this case, the template 40 where the received data 51 is appropriately input to each of the input items 41, 42, 43, 44 can be printed on a print tape 52. Further, the processes relating to the mode in the main program of FIG. 5 (S15, S16) can be omitted.

In the printing apparatus 1 of the present embodiment, the item data, a delimiter and a print start character string included in the data 51 received from the host apparatus 39 may be comprised of data having different kinds. Specifically, in the received data 51 of "A1BC2DEF34GHIJCR", the item data ("A", "B", "DEF" and "GHIJ") is comprised of alphabets and the delimiters ("1", "2", "3" and "4") are comprised of numbers and the print start character string ("CR") is comprised of a control code of an ASCII code. In this case of example, it can be recognized that no item data is between the delimiters "3" and "4". It can be also recognized that no item data is after the delimiter "33" from the item data after the delimiter "3". By comprising item data, a delimiter and a print start character string of data having different kinds, item data, a delimiter and a print start character string can be distinguished from each other precisely and a distinguishing process becomes simplified. The number of candidates for each of a delimiter and a print start character string or the number of candidates for both of them can likely be reduced compared to a case where a kind of item data, a delimiter and a print start character string is unknown or comprised of same kind of data. Or, one candidate for each of a delimiter and a print start character string can likely be determined, that is, a combination of item data, a delimiter and a print start character string is likely to be determined.

The printing apparatus 1 of the present embodiment can cope with a case where no print start character string is included in the received data 51 from the host apparatus 39. In this case, in the printing apparatus 1 of the present embodiment, after an imaginary print start character string is added to an end of the received data 51 from the host apparatus 39, the above-described main program and the like may be executed or the processes relating to the print start character string may be omitted from the above-described main program and the like and the print data may be produced based on only a delimiter candidate. In this case also, the above-described effects can be obtained.

While the presently exemplary embodiment has been shown and described, it is to be understood that this disclosure is fro the purpose of illustration and that various changes and modifications may be made without departing from the scope of the disclosure as set forth in the appended claims.

What is claimed is:

1. A printing apparatus comprising:
a template storing device that stores a template having a plurality of input items;
a receiving device that receives received data;
a defining data candidate obtaining device that obtains or provisionally determines any possible one or more of candidates for defining data from the received data, each of the candidates for defining data being a character or a character string included in the received data that is periodically repeated a number of times that is less than a number of the input items by one;
a data candidate provisionally determining device that makes provisional determination to choose a candidate for defining data from among the candidates for the defining data;
a first print data producing device that produces first print data by delimiting the received data into a plurality of delimited data based on the provisional determination by the data candidate provisionally determining device and inputting each of the delimited data to each of the input items of the template; and
a display device that displays a print image of the first print data.

2. The printing apparatus according to claim 1, wherein the defining data and each of the delimited data are different kinds of data.

3. The printing apparatus according to claim 1, further comprising:
a first printing device; and
a first input device that is operated by an user such that the first printing device prints the print image of the first print data that is displayed on the display device.

4. The printing apparatus according to claim 1, further comprising:
a defining data specifying device which specifies the defining data;
a second input device that is operated by an user such that the defining data specifying device specifies the defining data based on the provisional determination, while the first print data corresponding to the print image that is displayed on the display device is produced based on the provisional determination;
a second print data producing device that produces second print data by delimiting the received data into a plurality of delimited data based on the defining data and inputting each of the delimited data to each of the input items of the template; and
a second printing device that prints a print image of the second print data.

5. The printing apparatus according to claim 1, further comprising:
an end data candidate obtaining device that obtains or provisionally determines any possible one or more of candidates for end data from a data group in the received data based on the candidates for defining data, the end data representing an end of the received data and the any possible one or more of candidates for end data being any possible character strings that can be extracted from the data group that follows a last located character or a last located character string corresponding to each of the candidates for defining data,
wherein the data candidate provisionally determining device makes provisional determination to choose a candidate for defining data and a candidate for end data from among the candidates for the defining data and the candidates for the end data, respectively.

6. The printing apparatus according to claim 5, wherein the defining data, the end data and each of the delimited data is different kind of data.

7. The printing apparatus according to claim 5, further comprising:
a first printing device; and
a first input device that is operated by an user such that the first printing device prints the print image of the first print data that is displayed on the display device.

8. The printing apparatus according to claim 5, further comprising:
a defining data specifying device which specifies the defining data;
a end data specifying device which specifies the end data;
a third input device that is operated by an user such that the defining data specifying device specifies the defining data based on the provisional determination and the end data specifying device specifies the end data based on the provisional determination, wherein the first print data corresponding to the print image that is displayed on the display device is produced based on the provisional determination;
a third print data producing device that produces third print data by delimiting the received data into a plurality of delimited data based on the defining data and the end data and inputting each of the delimited data to each of the input items of the template; and
a third printing device that prints a print image of the third print data.

9. The printing apparatus according to claim 1, further comprising:
a fourth input device that is operated by a user to make the data candidate provisionally determining device renew the provisional determination.

10. The printing apparatus according to claim 1,
wherein the defining data candidate obtaining device determines number of the defining data included in the received data, the number of the defining data being any number less than number of the input items by two or more, and
wherein the defining data candidate obtaining device obtains one or more of the candidates for defining data, each of which being a character or a character string periodically repeated in the received data number of times that is equal to the any number less than the number of the input items by two or more.

11. The printing apparatus according to claim 10, wherein the defining data candidate obtaining device obtains the one or more of the candidates for defining data in such a manner that the defining data candidate obtaining device finds a character or a character string periodically repeated in the received data number of times as many as to the number of the defining data determined by the defining data candidate obtaining device, the number of the defining data being determined by repeatedly decrementing by one from a number that is less than the number of the input items by two.

12. A non-transitory computer program product that is used and executed by a printing apparatus, comprising:
a recording medium that can be read by a computer; and
a computer program stored in the recording medium that can be read by the computer,
wherein the computer program comprises:
a receiving step of receiving received data with a receiving device;

a defining data candidate obtaining step of obtaining or provisionally determining any possible one or more of candidates for defining data from the received data, each of the candidates for defining data being a character or a character string included in the received data that is periodically repeated a number of times that is less than a number of the input items by one;

a data candidate provisionally determining step of making provisional determination to choose a candidate for defining data from among the candidates for the defining data;

a first print data producing step of producing first print data by delimiting the received data into a plurality of delimited data based on the provisional determination by the data candidate provisionally determining step and inputting each of the delimited data to each of the input items of the template; and a display step of displaying a print image of the first print data on a display device.

13. The computer program product according to claim 12, wherein the defining data and each of the delimited data are different kinds of data.

14. The computer program product according to claim 12, further comprising:

a first printing step of printing the print image of the first print data that is displayed on the display device with a first printing device when a first input device receives a command by an user.

15. The computer program product according to claim 12, further comprising:

a defining data specifying step of specifying the defining data based on the provisional determination, while the first print data corresponding to the print image displayed on the display device is produced when a second input device receives a command by an user;

a second print data producing step of producing second print data by delimiting the received data into a plurality of delimited data based on the defining data and inputting each of the delimited data to each of the input items of the template; and a second printing step of printing a print image of the second print data with a second printing device.

16. The computer program product according to claim 12, further comprising:

an end data candidate obtaining step of obtaining or provisionally determining any possible one or more of candidates for end data from a data group in the received data based on the candidates for defining data, the end data representing an end of the received data and the any possible one or more of candidates for end data being any possible character strings that can be extracted from the data group that follows a last located character or a last located character string corresponding to each of the candidates for defining data, wherein in the data candidate provisionally determining step, the provisional determination is made to choose a candidate for defining data and a candidate for end data from among the candidates for the defining data and a candidate for the end data, respectively.

17. The computer program product according to claim 16, wherein the defining data, the end data and each of the delimited data is different kind of data.

18. The computer program product according to claim 16, further comprising:

a first printing step of printing a print image of the first print data that is displayed on the display device with a first printing device when a first input device receives a command by an user.

19. The computer program product according to claim 16, further comprising:

a defining data and end data specifying step of specifying the defining data and the end data based on the provisional determination by which first print data corresponding to a print image displayed on the display device is produced, when a third input device receives a command by an user;

a third print data producing step of producing third print data by delimiting the received data into a plurality of delimited data based on the defining data and the end data and inputting each of the delimited data to each of the input items of the template; and a third printing step of printing a print image of the third print data with a third printing device.

20. The computer program product according to claim 12, further comprising:

a renewal step of renewing the provisional determination when a fourth input device receives a command by a user to make the data candidate provisionally determining device.

21. The computer program product according to claim 12, wherein the defining data candidate obtaining step determines number of the defining data included in the received data, the number of the defining data being any number less than number of the input items by two or more, and wherein the defining data candidate obtaining step obtains one or more of the candidates for defining data, each of which being a character or a character string periodically repeated in the received data number of times that is equal to the any number less than the number of the input items by two or more.

22. The computer program product according to claim 21, wherein the defining data candidate obtaining step obtains the one or more of the candidates for defining data in such a manner that the defining data candidate obtaining step finds a character or a character string periodically repeated in the received data number of times as many as to the number of the defining data determined by the defining data candidate obtaining step, the number of the defining data being determined by repeatedly decrementing by one from a number that is less than the number of the input items by two.

* * * * *